US011164327B2

(12) United States Patent
Ren et al.

(10) Patent No.: US 11,164,327 B2
(45) Date of Patent: Nov. 2, 2021

(54) ESTIMATION OF HUMAN ORIENTATION IN IMAGES USING DEPTH INFORMATION FROM A DEPTH CAMERA

(71) Applicant: INTEL CORPORATION, Santa Clara, CA (US)

(72) Inventors: Haibing Ren, Beijing (CN); Yimin Zhang, Beijing (CN); Xiaobo Hu, Beijing (CN); Fei Duan, Beijing (CN)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 16/098,649

(22) PCT Filed: Jun. 2, 2016

(86) PCT No.: PCT/CN2016/084512
§ 371 (c)(1),
(2) Date: Nov. 2, 2018

(87) PCT Pub. No.: WO2017/206144
PCT Pub. Date: Dec. 7, 2017

(65) Prior Publication Data
US 2019/0147613 A1    May 16, 2019

(51) Int. Cl.
*G06T 7/00* (2017.01)
*G06T 7/73* (2017.01)
(Continued)

(52) U.S. Cl.
CPC ............ *G06T 7/73* (2017.01); *G06K 9/00214* (2013.01); *G06K 9/00228* (2013.01);
(Continued)

(58) Field of Classification Search
CPC ......... G06T 7/73; G06T 7/50; G06K 9/00214; G06K 9/00228; G06K 9/6282; G06K 9/621
See application file for complete search history.

(56) References Cited

U.S. PATENT DOCUMENTS

2012/0237118 A1    9/2012  Hyuga et al.
2012/0293635 A1*  11/2012  Sharma .............. G06K 9/00234
                                                               348/50
(Continued)

FOREIGN PATENT DOCUMENTS

CN    103608841    2/2014
CN    104025118    9/2014
(Continued)

OTHER PUBLICATIONS

Baltieri et al., "People Orientation Recognition by Mixtures of Wrapped Distributions on Random Trees", ECCV 2012, pp. 270-283 (2012).
(Continued)

*Primary Examiner* — Pakee Fang
(74) *Attorney, Agent, or Firm* — Hanley, Flight & Zimmerman, LLC

(57) ABSTRACT

Techniques are provided for estimation of human orientation and facial pose, in images that include depth information. A methodology embodying the techniques includes detecting a human in an image generated by a depth camera and estimating an orientation category associated with the detected human. The estimation is based on application of a random forest classifier, with leaf node template matching, to the image. The orientation category defines a range of angular offsets relative to an angle corresponding to the human facing the depth camera. The method also includes performing a three dimensional (3D) facial pose estimation of the detected human, based on detected facial landmarks,
(Continued)

in response to a determination that the estimated orientation category includes the angle corresponding to the human facing the depth camera.

20 Claims, 10 Drawing Sheets

(51) Int. Cl.
  *G06K 9/00* (2006.01)
  *G06K 9/62* (2006.01)
  *G06T 7/50* (2017.01)
(52) U.S. Cl.
  CPC .............. *G06K 9/6282* (2013.01); *G06T 7/50* (2017.01); *G06K 9/621* (2013.01)

(56) References Cited

U.S. PATENT DOCUMENTS

| | | | |
|---|---|---|---|
| 2014/0105504 A1* | 4/2014 | Krupka | G06K 9/4661 382/195 |
| 2014/0241617 A1 | 8/2014 | Shotton et al. | |
| 2015/0016693 A1* | 1/2015 | Gattuso | H04N 5/23219 382/118 |
| 2016/0086017 A1* | 3/2016 | Rodriguez | G06K 9/00275 382/118 |
| 2016/0224855 A1* | 8/2016 | Al-Hamad | G06F 3/012 |
| 2018/0025240 A1* | 1/2018 | Klement | G06K 9/00845 348/47 |

FOREIGN PATENT DOCUMENTS

| | | |
|---|---|---|
| EP | 2893491 | 7/2015 |
| WO | 2016/045711 | 3/2016 |
| WO | 2017/197620 | 11/2017 |
| WO | 2017/206144 | 12/2017 |

OTHER PUBLICATIONS

Fanelli et al., "Real Time Head Pose Estimation with Random Regression Forests", IEEE Conference on Computer Vision and Pattern Recognition (CVPR'11), pp. 617-624 (2011).
Hu et al., "Robust Head-shoulder Detection Using a Two-Stage Cascade Framework", 2014 22nd International Conference on Pattern Recognition, IEEE Computer Society, pp. 2796-2801 (2014).
International Preliminary Report on Patentabilty for International Application No. PCT/CN2016/082603, dated Nov. 29, 2018, 6 pages.
International Preliminary Report on Patentabilty for International Application No. PCT/CN2016/084512, dated Dec. 13, 2018, 5 pages.
International Search Report for International Application No. PCT/CN2016/082603, dated Feb. 22, 2017, 4 pages.
International Search Report for International Application No. PCT/CN2016/084512, dated Feb. 20, 2017, 5 pages.
Munaro et al., "Fast RGB-D People Tracking for Service Robots", Autonomous Robots, 15 pages (2014).
Ouyang et al., "DeepID-Net: Deformable Deep Convolutional Neural Networks for Object Detection", CVPR2015, pp. 2403-2412 (2015).
Strupczewski et al., "Head Pose Tracking from RGBD Sensor Based on Direct Motion Estimation", Pattern Recognition and Machine Intelligence, vol. 9124, pp. 202-212 (2015).
Tian et al., "Pedestrian Detection aided by Deep Learning Semantic Tasks", arXiv:1412.0069v1, 14 pages (Nov. 29, 2014).
Written Opinion of the International Searching Authority for International Application No. PCT/CN2016/082603, dated Feb. 22, 2017, 4 pages.
Written Opinion of the International Searching Authority for International Application No. PCT/CN2016/084512, dated Feb. 20, 2017, 4 pages.

* cited by examiner

200

Front View
202

Front-Left View
204

Front-Right View
206

Left View
208

Right View
210

Back View
212

ESTIMATION OF HUMAN ORIENTATION IN IMAGES USING DEPTH INFORMATION FROM A DEPTH CAMERA

BACKGROUND

Estimation of the orientation of a human in an image is often useful, for example in surveillance applications, robotic applications, or as a preliminary operation in an image processing system. In a robotic application, for example, it may be desirable for a robot to move to a position where it is facing a human prior to interacting with the human. Existing methods for orientation estimation generally suffer from a number of limitations. These may include one or more of: inconsistent recognition accuracy for different orientations, requiring an entire body image, providing relatively coarse estimation, requiring a certain distance between camera and subject, and exhibiting an inability to deal with partial occlusions of the subject. Some other existing methods may estimate facial poses with greater precision but require a viewing angle that is nearly an exact frontal view to produce results of acceptable accuracy. These methods also tend to require relatively high quality images with no occlusions.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for improved estimation of human orientation and facial pose, in images that include depth information. Such images may be generated, for example, by a depth camera that provides both color (red-green-blue or RGB) pixels and depth pixels. Such images may be referred to as RGBD images. The techniques described herein may provide a coarse estimate of the orientation of a human body in an image viewed from any angle (e.g., 360 degrees) and any pose (e.g., standing, sitting, squatting, etc.), as a first processing stage, according to some embodiments. The coarse estimate may be provided in the form of orientation categories such as, for example, frontal, frontal-left, frontal-right, left, right, and backward facing orientations, where each category encompasses a specified range of angles. The orientation category estimates may be generated by a random forest classifier, with leaf node template matching. The techniques may also provide a second processing stage for a more precise three dimensional (3D) facial pose estimation, based on detected facial landmarks, in the case of a frontal view.

The disclosed techniques may also provide for generally increased estimation accuracy, including the capability to work with lower quality images and images with partial occlusion, compared to existing methods that do not exploit depth information, as will be appreciated in light of this disclosure. The use of depth information provides additional discriminative features and further enables these techniques to ignore complex backgrounds that could otherwise degrade estimation performance. Additionally, in some embodiments, the estimation may be based on images that capture only the upper portion of a human body, or otherwise are based on the upper body portion or other targeted body portion (e.g., head and shoulders regions) captured in a given image such that non-target body portions captured in the image are ignored.

The techniques described herein may allow for reduced computational overhead and improved real-time performance, compared to existing methods, given the two stage approach. Additionally, these techniques do not require special camera calibration procedures and can be implemented in any desired platform including, for example, a mobile device such as a tablet or smartphone that includes a depth camera or can receive images from a depth camera. These techniques may further be implemented in hardware or software or a combination thereof.

Figure 1:
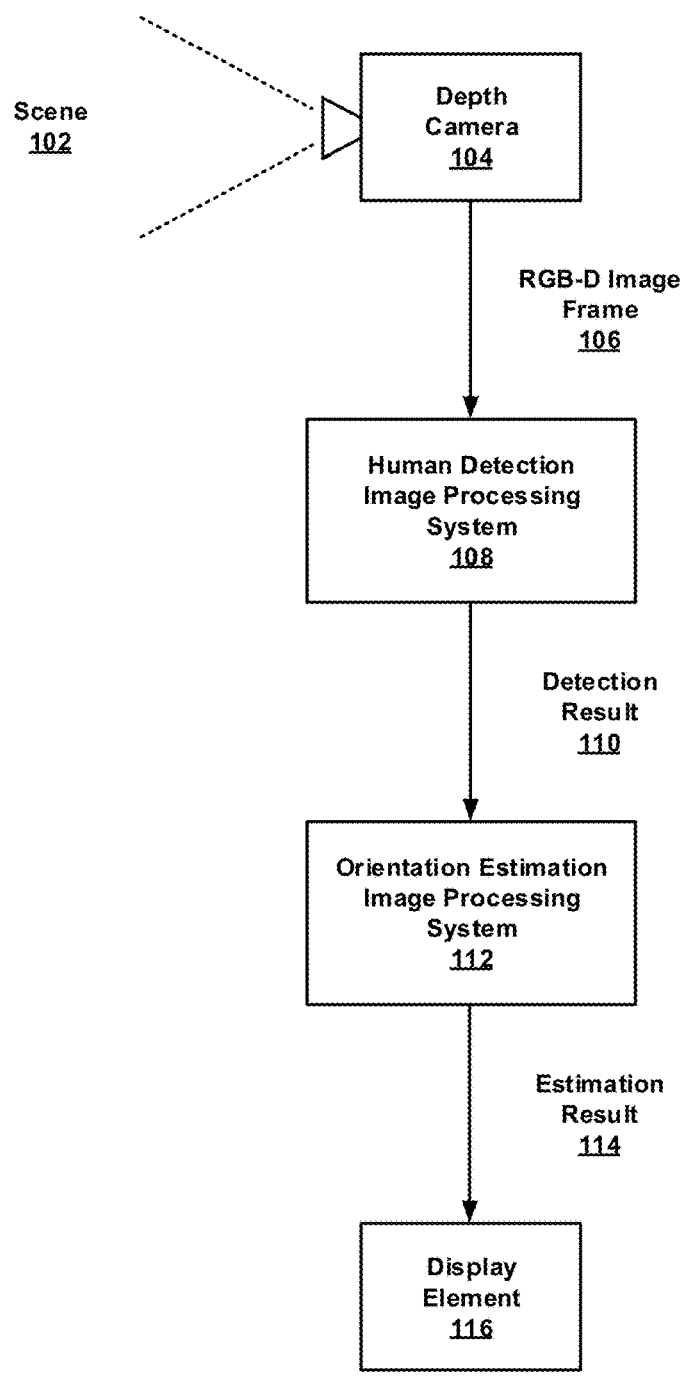
FIG. 1 is a top level block diagram of an implementation of a human orientation estimation system, configured in accordance with certain of the embodiments disclosed herein.

FIG. 1 is a top level block diagram 100 of an implementation of a human orientation estimation system, configured in accordance with certain of the embodiments disclosed herein. A depth camera 104 is configured to generate RGBD image frames 106 of a scene 102. The scene may encompass any subject matter and may or may not include people. One or more RGBD image frames 106 are provided to the human detection image processing system 108 which is configured to generate detection results 110. The detection results are provided to orientation estimation image processing system 112, the operations of which will be described in greater detail below, and orientation estimation results 114 are generated for any detected humans. The orientation estimation results may include an orientation category to provide a coarse estimate and a more precise three dimensional (3D) facial pose estimation. The detection and estimation results may be presented to a user or operator of the system through a display element 116 or other suitable mechanism.

Figure 2:
FIG. 2 illustrates examples of categories of human orientations, in accordance with certain of the embodiments disclosed herein.
Figure 2:
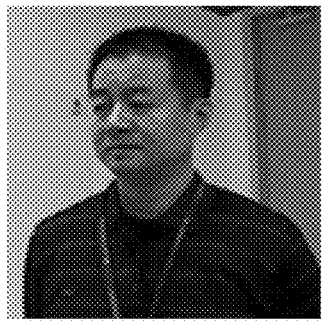
Figure 2:
Figure 2:
Figure 2:
Figure 2:
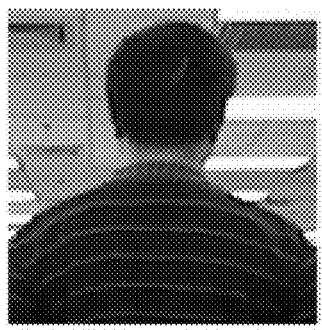

FIG. 2 illustrates examples 200 of categories of human orientations, in accordance with certain of the embodiments disclosed herein. The orientation categories, which provide coarse estimates of orientation, may include a frontal view 202 (e.g., in the range of −30 to +30 degrees), a frontal-left view 204 (e.g., in the range of −67.5 to −30 degrees), a frontal-right view 206 (e.g., in the range of 30 to 67.5 degrees), a left view 208 (e.g., in the range of −67.5 to −135 degrees), a right view 210 (e.g., in the range of 67.5 to 135 degrees), a back view 212 (e.g., in the range of −135 to −180 degrees and 135 to +180 degrees). These angular ranges are provided as examples and other suitable values may be used. The angles are specified relative to a zero degree bearing which indicates an orientation facing directly towards the camera.

Figure 3:
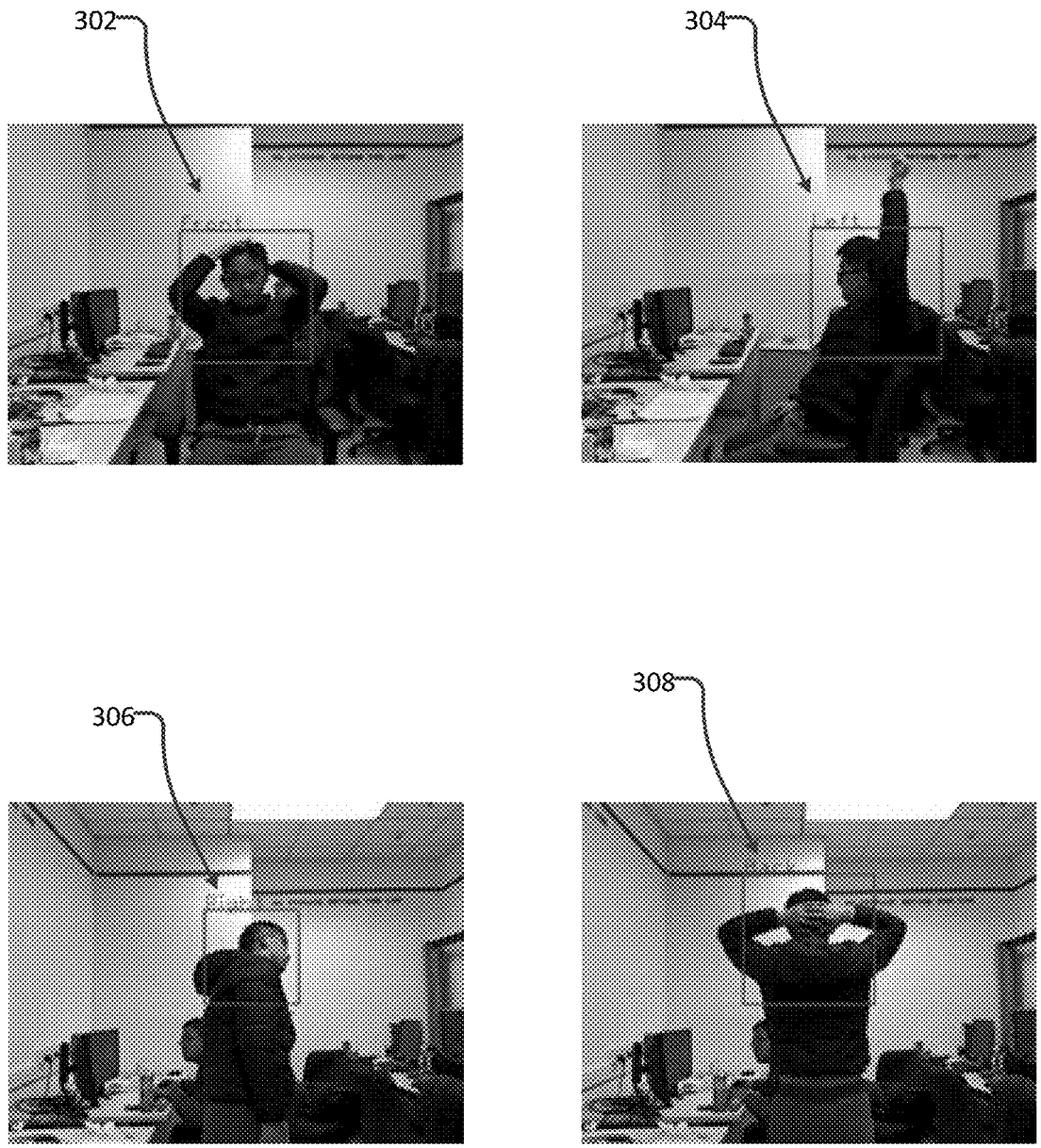
FIG. 3 illustrates examples of orientation estimation applied to complex postures, in accordance with certain of the embodiments disclosed herein.

FIG. 3 illustrates examples 300 of orientation estimation applied to complex poses and postures, in accordance with certain of the embodiments disclosed herein. For example, in 302 the image presents a person in a frontal view, sitting down, with hands on top of head. In image 304, the person is facing left, also sitting down, with one arm raised. In image 306 the person is facing right, standing up and leaning to his left. In image 308, the person is facing backward from the camera, standing up, with hands behind his head. The techniques described herein may allow for relatively accurate orientation estimation when applied to any of these images, as will be apparent in light of this disclosure.

Figure 4:
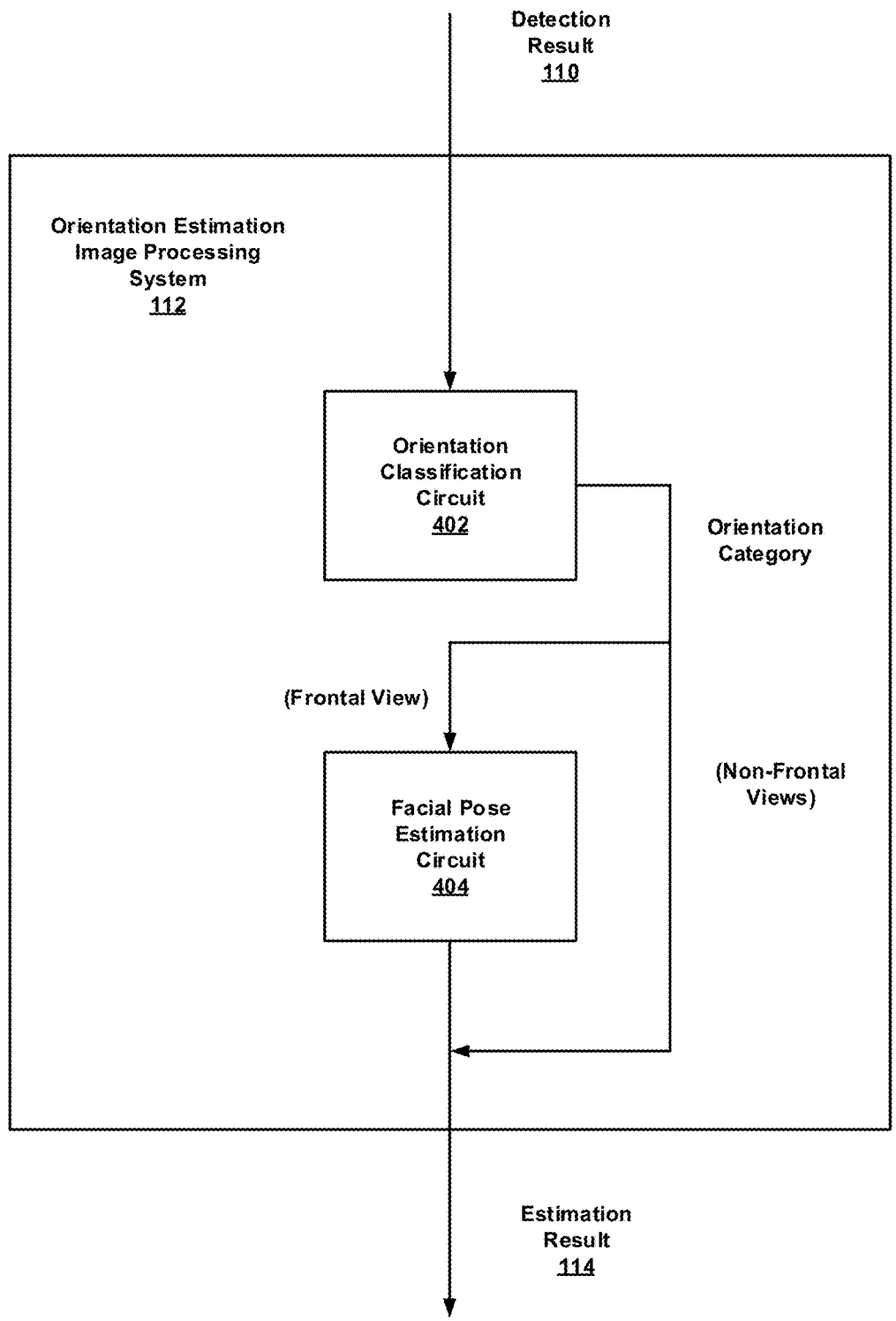
FIG. 4 is a top level block diagram of an orientation estimation image processing system, configured in accordance with certain of the embodiments disclosed herein.

FIG. 4 is a top level block diagram of an orientation estimation image processing system 112, configured in accordance with certain of the embodiments disclosed herein. The orientation estimation image processing system 112 is shown to include an orientation classification circuit 402, and a facial pose estimation circuit 404. The orientation classification circuit 402 may be configured to estimate an orientation category for the detected human through the application of a random forest classifier with leaf node template matching to the depth image, as will be explained in greater detail below. The facial pose estimation circuit 404 may be configured to provide a 3D facial pose estimation of the detected human, based on detected facial landmarks, as will be explained in greater detail below. The facial pose estimation may be performed when the orientation classification indicates that the human is generally facing the camera (e.g., in the frontal view category). Knowledge of precise facial pose is typically of importance only when the subject is facing the camera.

Figure 5:
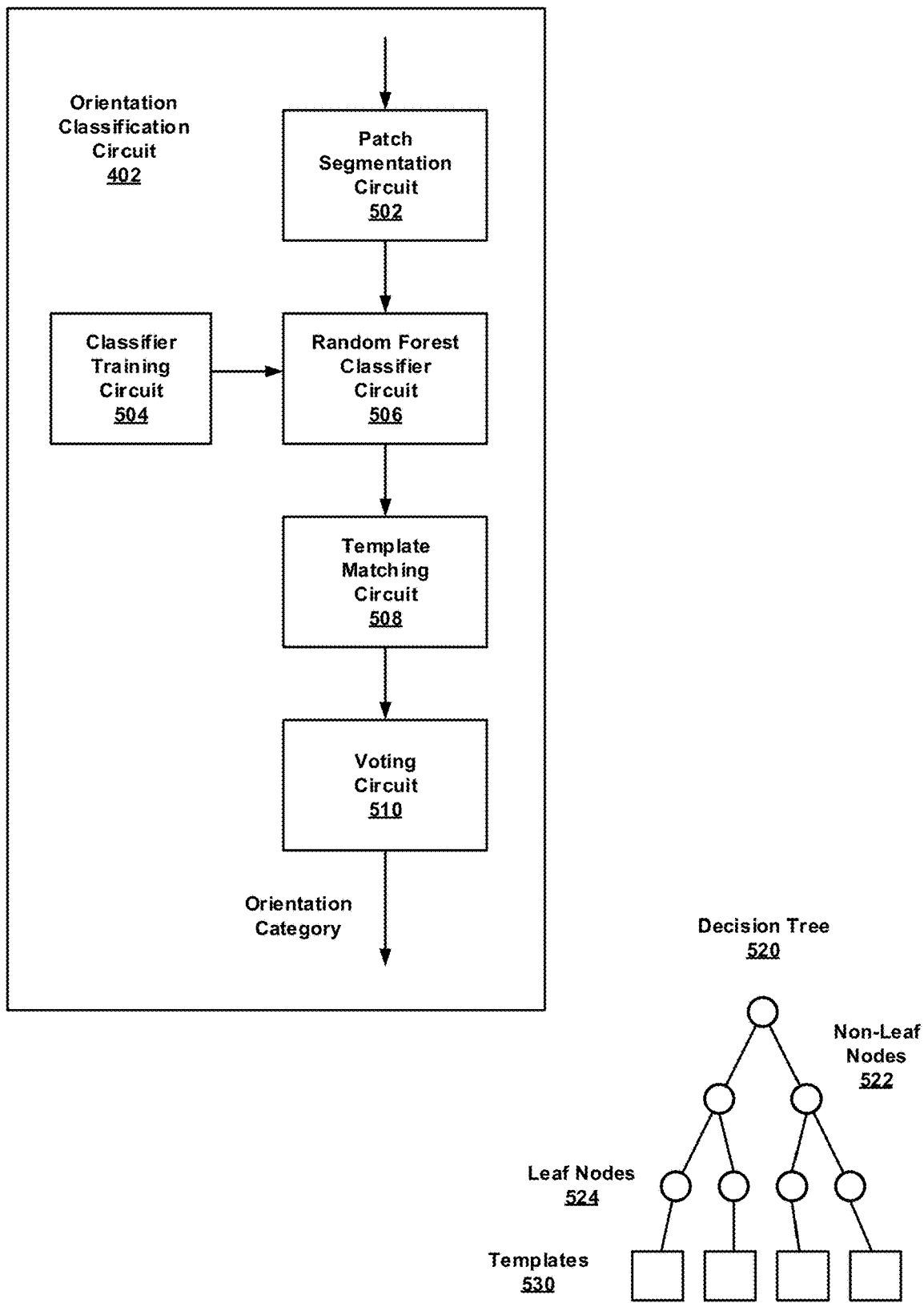
FIG. 5 is a more detailed block diagram of an orientation classification circuit, configured in accordance with certain of the embodiments disclosed herein.

FIG. 5 is a more detailed block diagram of an orientation classification circuit 402, configured in accordance with certain of the embodiments disclosed herein. The orientation classification circuit 402 is shown to include a patch segmentation circuit 502, a random forest classifier circuit 506, a template matching circuit 508, a voting circuit 510, and a classifier training circuit 504.

The patch segmentation circuit 502 may be configured to segment the depth image into a number of smaller regions or patches to be operated on by the classifier. In some embodiments, the depth image may be cropped to include only the head and shoulder region of the image prior to segmentation into patches. The random forest classifier circuit 506 may be configured as a collection of binary decision trees 520. Each tree comprises a number of paths through non-leaf nodes 522 (e.g., from parent node to a left or right child node), and each path terminates in a leaf node 524. Although only two levels of non-leaf nodes 522 are shown in this example illustration, the binary decision tree 520 may in general have any number of levels.

At each non-leaf node 522, a patch classifier operates on one of the patches to determine a left or right path to the next level (child) node down the tree. A comparison is made between the patch $F_1$ from the depth image and a patch $F_2$ with which the patch classifier was trained. In some embodiments, the patch classifier may be expressed by the following equation:

$$\frac{\sum_{q \in F_1} I(q)}{|F_1|} - \frac{\sum_{q \in F_2} I(q)}{|F_2|} > \alpha \qquad \text{equ (1)}$$

where $I(q)$ represents either the RGB value or the depth value of each pixel q in the patch, and $|F|$ represents the area or size of the patch. The $\alpha$ term is a threshold value that is generated in the training process, as described below, and serves to distinguish between the patches.

When the path to the child node is determined, if that child node is also a non-leaf node, the classification process is repeated as above. Each non-leaf node patch classifier will typically operate on a different patch of the depth image. Following this process down the tree will eventually lead to a leaf node where a template match will be performed.

The template matching circuit 508 may be configured to match the depth image that reaches a leaf node to a number of template images 530 that were associated with that leaf node during training, as will be explained below. The template matching circuit 508 searches for a nearest neighbor to the image among the templates by calculating a score for each template $T_n$. In some embodiments, the scores may be calculated according to the following equation:

$$score_n = \sum_{x,y} |I(x, y) - T_n(x, y)|$$

where $I(x,y)$ represents the RGB or depth values of the pixels at locations (x,y) of the depth image, and $T_n$ represents template image n. The template with the lowest score is selected as the nearest neighbor and the orientation category associated with that template (e.g., during training) is selected as the decision for that tree.

Voting circuit 510 may be configured to collect the orientation category decisions from each of the trees of the random forest classifier and perform a majority vote, or other suitable statistical measure, to determine an overall orientation category result for the forest classifier.

The classifier training circuit 504 may be configured to independently train each of the decision trees 520 of the random forest classifier. A number of training depth images are made available for training, each image depicting a human in a known orientation category. In some embodiments, there may be a relatively large number of training images that include a wide variety of positions and poses. The training images may be cropped to include only the head and shoulder regions of the human. Each training image may be associated with a label to indicate the orientation category of that image. Random selections from the full set of available training images are used to train each decision tree.

The training images are segmented into a number of patches. In some embodiments, a limitation may be placed on the number of patches by restricting the patch size to a certain range and/or requiring that the average intensity in a patch be within a specified range. For each non-leaf node of the tree, the patch classifier of equation (1) above is applied to all (or most) combinations of patches and the combination with the best discrimination performance is chosen for that node. The α threshold is calculated as the value that provides the best distinction between the patches. The determination of a best distinguishing patch, and an associated α, value complete the training of the patch classifier for the non-leaf node. The training image is then passed to a left or right child node based on the application of the patch classifier to that image and the training continues in similar fashion on that child node.

The training continues until a termination condition is reached, at which point the child node is transformed into a leaf node. In some embodiments, there may be two termination conditions. One termination condition may be that all of the training images that reach a node are of the same orientation category, indicating that the path through the tree to that node has been trained successfully. A second termination condition may be that the number of training images that reach the node is less than a threshold value. For example, as the tree grows deeper, the training images are split among increasing numbers of paths to non-leaf nodes and a point is reached where there is limited gain from further splitting of a node into child nodes. When a non-leaf node is converted to a leaf node, the training images (and associated labels) are saved as templates for that non-leaf node.

Figure 6:
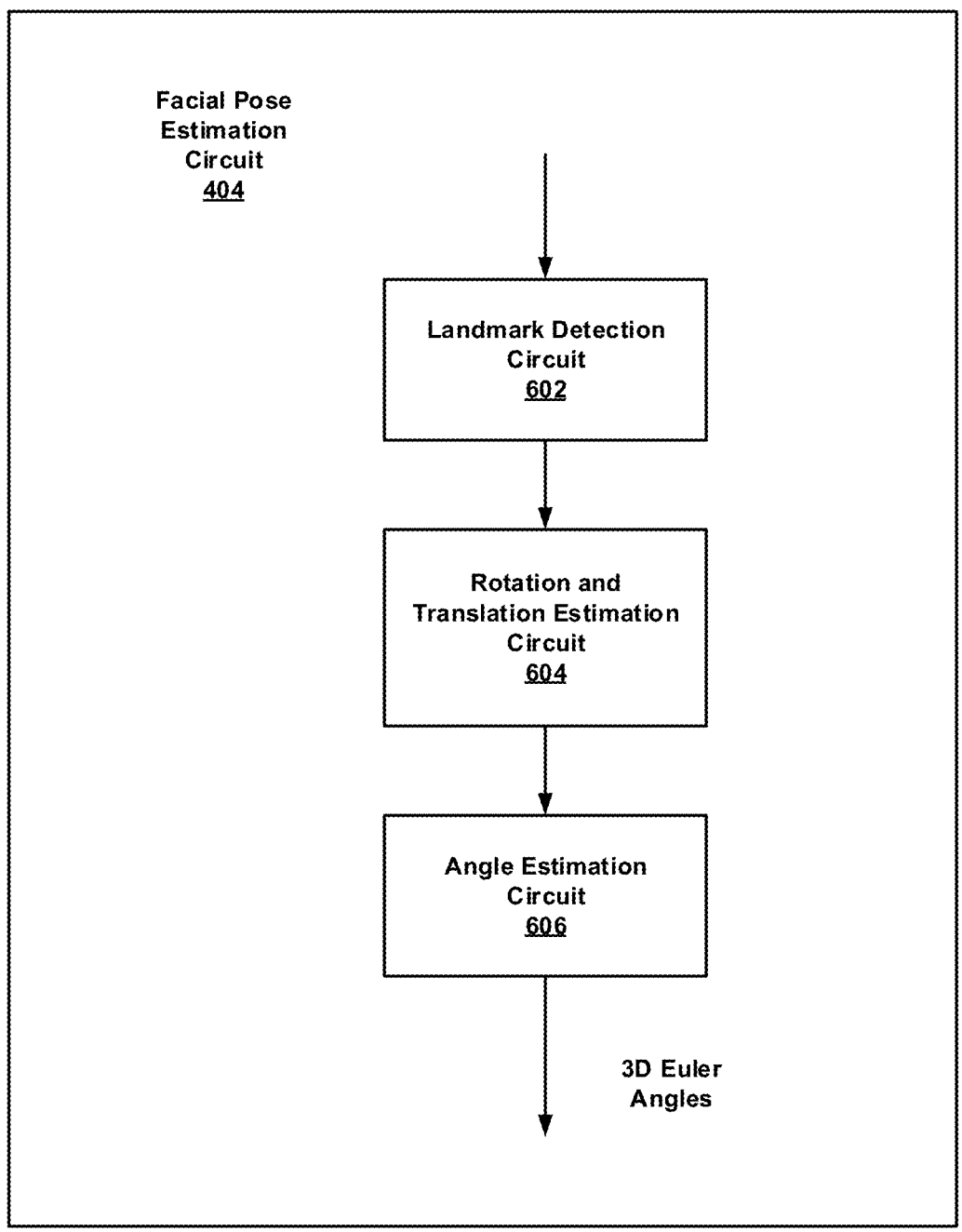
FIG. 6 is a more detailed block diagram of a facial pose estimation circuit, configured in accordance with certain of the embodiments disclosed herein.

FIG. 6 is a more detailed block diagram of a facial pose estimation circuit 404, configured in accordance with certain of the embodiments disclosed herein. The facial pose estimation circuit 404 is shown to include a landmark detection circuit 602, a rotation and translation estimation circuit 604, and an angle estimation circuit 606.

Figure 7:
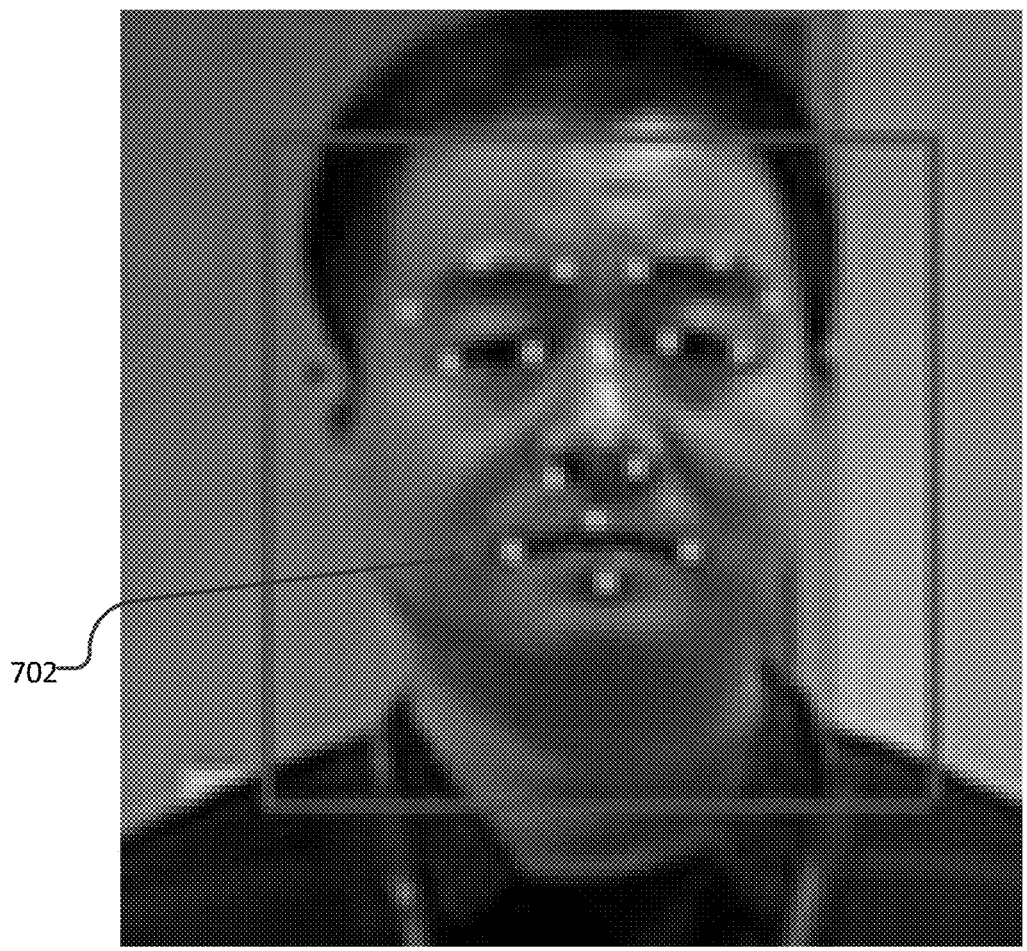
FIG. 7 illustrates detected facial landmarks, in accordance with certain of the embodiments disclosed herein.

The landmark detection circuit 602 may be configured to analyze the depth image when the orientation category has been estimated as a frontal view. Facial feature landmarks 702, as illustrated in FIG. 7, may be detected in two dimensions using known techniques in light of the present disclosure. The 2D landmarks (x,y) may be extended to three dimensions (X,Y,Z) using depth information from the image. In some embodiments, the 3D landmarks (X,Y,Z) may be calculated from the 2D landmarks (x,y) as follows:

$$\left(X = \frac{x - x_0}{f} * \text{depth}, Y = \frac{y - y_0}{f} * \text{depth}, Z = \text{depth}\right)$$

where depth is the value of the depth pixels at the landmark, f is the focal length of the depth camera, and $(x_0, y_0)$ are the coordinates of the camera's optical center. The 3D coordinates of all of the detected landmarks may be grouped into a vector:

$$S_1 = (X_0, Y_0, Z_0, X_1, Y_1, Z_1, \ldots, X_{N-1}, Y_{N-1}, Z_{N-1}),$$

This vector may be compared to a template vector $S_2$ of 3D landmarks corresponding to a known standard pose (e.g., of a facial subject that is posed in a straight and still position).

The rotation and translation estimation circuit 604 may be configured to estimate a translation matrix (T) and rotation matrix (R) between $S_1$ and $S_2$, using least squared minimization techniques, where:

$$S_1 = R(S_2 - T), \text{ and}$$

-continued $$R = \begin{bmatrix} r_{11} & r_{12} & r_{13} \\ r_{21} & r_{22} & r_{23} \\ r_{31} & r_{32} & r_{33} \end{bmatrix}, T = \begin{bmatrix} t_{11} & t_{12} & t_{13} \\ t_{21} & t_{22} & t_{23} \\ t_{31} & t_{32} & t_{33} \end{bmatrix}$$

The angle estimation circuit 606 may be configured to perform Lower/Upper (LU) decomposition on the rotation matrix R to calculate three Euler angles as follows:

$$\theta_x = \operatorname{atan2}(r_{32}, r_{33})$$

$$\theta_y = \operatorname{atan2}\left(-r_{31}, \sqrt[2]{r_{32}^2 + r_{33}^2}\right)$$

$$\theta_z = \operatorname{atan2}(r_{21}, r_{11})$$

The Euler angles describe the facial pose in three angular dimensions.

In some embodiments, the facial feature landmarks 702 may be pre-filtered to reject features that were not detected correctly and improve estimation accuracy. For example if the distance between two facial feature landmarks is greater than the size of the subject's head, one or both may be rejected as erroneous.

Figure 8:
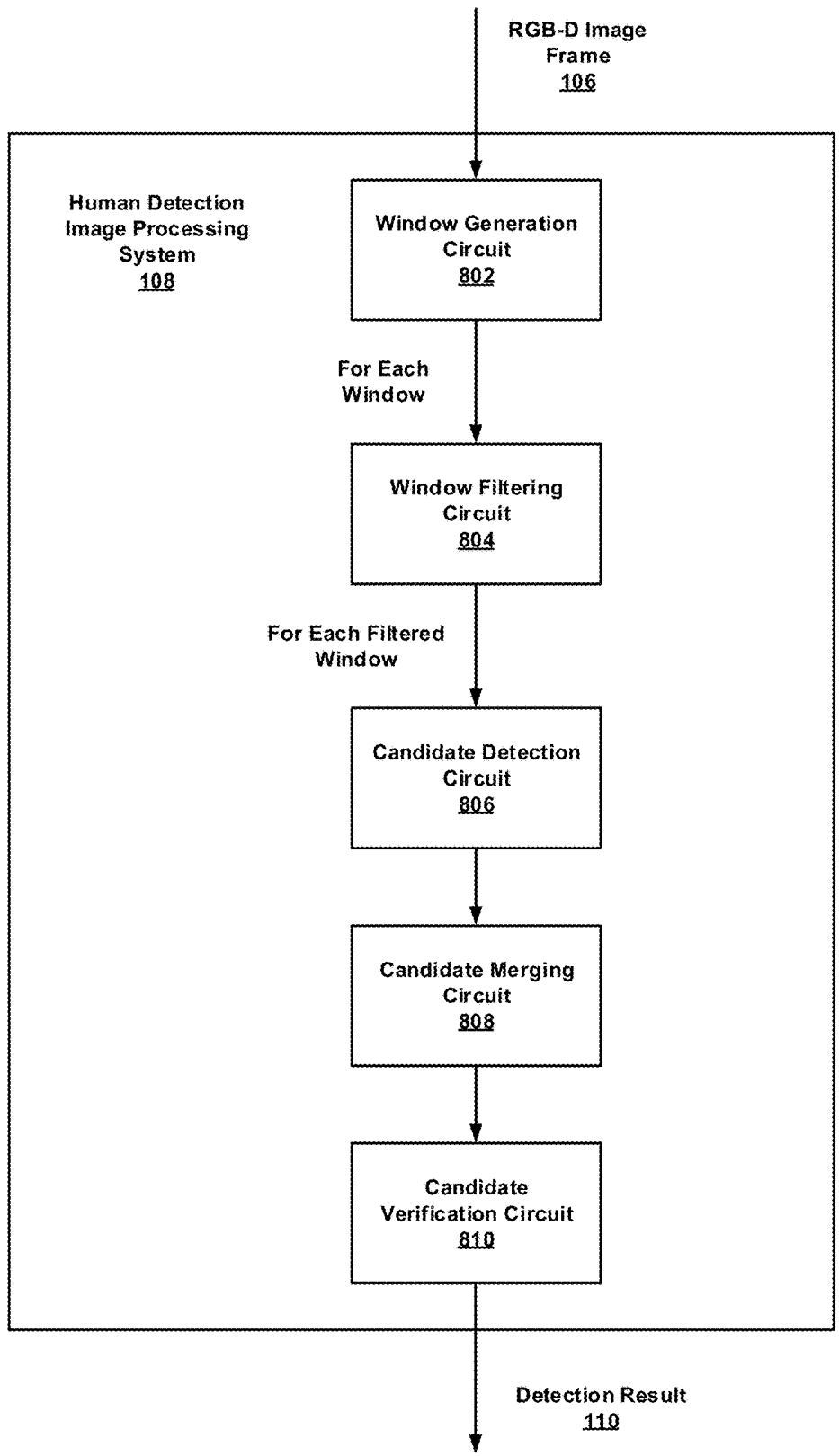
FIG. 8 is a more detailed block diagram of a human detection image processing system, configured in accordance with certain of the embodiments disclosed herein.

FIG. 8 is a more detailed block diagram of a human detection image processing system 108, configured in accordance with certain of the embodiments disclosed herein. The disclosed techniques include segmentation of an RGBD image into a relatively large number of windows (possibly on the order of millions of windows) and checking each window to determine the presence or absence of an upper-body portion of a human. At a top level, the techniques can be grouped into three stages: window filtering, candidate detection based on information interior to the window, and candidate verification based on window context. Each stage may reject some windows to improve processing performance in the following stage. Windows that survive through all three of the stages may be considered as positive detection results, which is to say that they include a human. As there can be millions of windows requiring analysis, the window filtering stage is configured to perform the first stage of rejection of non-human-containing windows with relatively minimal computation.

In more detail, then, the human detection image processing system is shown to include a window generation circuit 802, a window filtering circuit 804, a candidate detection circuit 806, a candidate merging circuit 808, and a candidate verification circuit 810.

The window generation circuit 802 may be configured to segment an RGBD image into a number of windows of varying size, position, and degree of overlap. In some embodiments the windows may be square (e.g., the width and height being substantially equal), to reduce the number of possible window geometries for consideration. In some embodiments, the position of each window may be shifted, relative to a neighboring window, by 5 to 10 percent of the window width in the vertical and/or the horizontal direction. In some embodiments, the window sizes may range from a minimum selected size up to the size of the entire image in scale factor steps of approximately 1.2 to 1.4. So, for example, with a scale factor step of 1.4 and a minimum window size of 100×100 pixels, the window sizes would be 100×100, 140×140, 196×196, 275×275, 384×384, . . . , up to the full size of the image.

The window filtering circuit 804 may be configured to estimate the distance to a subject in each of the windows based on an average of the values of the depth pixels in the window and to filter those windows to reject windows having a size that falls outside of a desired window size range. The desired window size range is matched to an expected size for a human body (or portion thereof) at a given distance and may be calculated from the estimated subject distance and the focal length of the depth camera. The collective output of circuit 804 is thus a target set of windows, which is a subset of all windows generated by circuit 802.

The candidate detection circuit 806 may be configured to generate classifier features for each of the windows that survive filtering and to apply a cascade classifier to those windows to create a smaller set of candidate windows based on those generated features. In other words, the cascade classifier may be configured to perform preliminary detection of a human in each of the filtered windows using information that is contained in the window.

The candidate merging circuit 808 may be configured to merge neighboring candidate windows to further reduce the set of candidate windows. The candidate verification circuit 810 may be configured to execute a linear classifier on the merged candidate windows to verify the human detection. The linear classifier may be configured to use additional context information, from regions of the image that surround the merged candidate windows. This context information may allow for the use of a reduced complexity linear classifier (e.g., reduced training and reduced computation time), while maintaining a level of accuracy and false alarm rate provided by more complex classifiers used in traditional approaches.

Methodology

Figure 9:
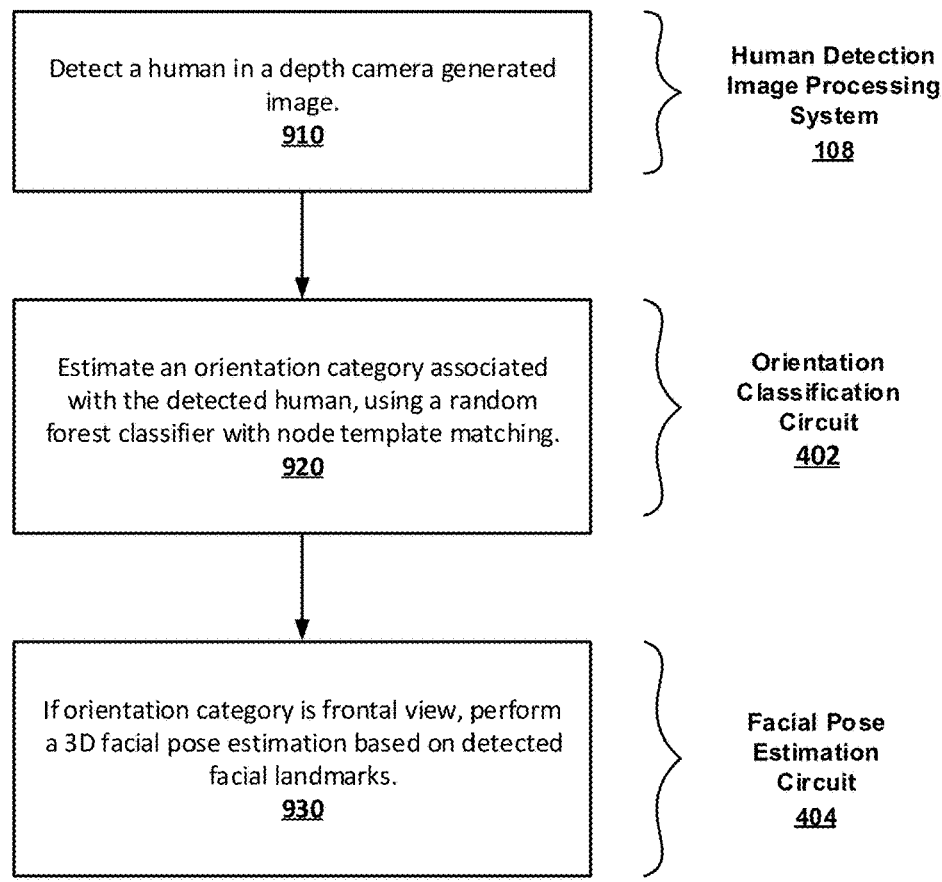
FIG. 9 is a flowchart illustrating a methodology for estimation of orientation of humans in images, in accordance with certain of the embodiments disclosed herein.

FIG. 9 is a flowchart illustrating an example method 900 for estimation of orientation and facial pose of humans, in images generated by a depth camera, in accordance with an embodiment of the present disclosure. As can be seen, example method 900 includes a number of phases and sub-processes, the sequence of which may vary from one embodiment to another. However, when considered in the aggregate, these phases and sub-processes form a process for orientation estimation in accordance with certain of the embodiments disclosed herein. These embodiments can be implemented, for example using the system architecture illustrated in FIGS. 1, 4, 5, 6, and 8 described above. However other system architectures can be used in other embodiments, as will be apparent in light of this disclosure. To this end, the correlation of the various functions shown in FIG. 9 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 900. Thus other embodiments may have fewer or more modules and/or sub-modules depending on the granularity of implementation. Numerous variations and alternative configurations will be apparent in light of this disclosure.

As illustrated in FIG. 9, in one embodiment, method 900 for estimation of orientation of humans in images that include depth information commences by detecting, at operation 910, the presence of a human in the image. The image may be provided by a depth camera such that it includes both color (e.g., RGB) pixels and depth pixels.

Next, at operation 920, if a human was detected in the image, an orientation category is estimated based on the application of a random forest classifier to the image. The random forest classifier incorporates template matching at the leaf nodes of the classifier trees to find a nearest neighbor to determine the best match for that tree. The classifier result is based on a vote of the results from all (or most) of the trees. The orientation category provides a relatively coarse estimate of the orientation of the detected human. For example, in some embodiments, the orientation categories may include frontal, frontal-left, frontal-right, left, right, and back. Each category may be associated with an angular range, as previously described.

At operation 930, if the estimated orientation category is frontal (e.g., the category that includes the angle corresponding to the human facing the depth camera), then a 3D facial pose estimation is performed. The 3D facial pose estimation is based on detected facial landmarks of the human detected in the image. In some embodiments, the facial landmarks are mapped to three dimensions based on the values of depth pixels in the image. A rotation and translation matrix, associated with a transformation between the 3D mapped facial features and a 3D template of a standard facial pose, may then be estimated and used to calculate Euler angles that describe the 3D facial pose. In some embodiments, the matrices may be estimated based on a least squares minimization calculation and the Euler angles may be estimated from an LU decomposition of the rotation matrix.

Of course, in some embodiments, additional operations may be performed, as previously described in connection with the system. These additional operations may include, for example, independently training each tree of the random forest classifier on random samples of training images. The training may evaluate discrimination performance at each non-leaf node of each decision tree of the random forest classifier to select a path through the tree and generate child node splits until reaching a terminating condition. Training samples that reach a leaf node are saved as templates to be associated with that node for later template matching during classifier operation.

Further additional operations may include, for example, validating the detected facial landmarks to reject landmarks associated with reduced quality (e.g., below a selected quality threshold).

Example System

Figure 10:
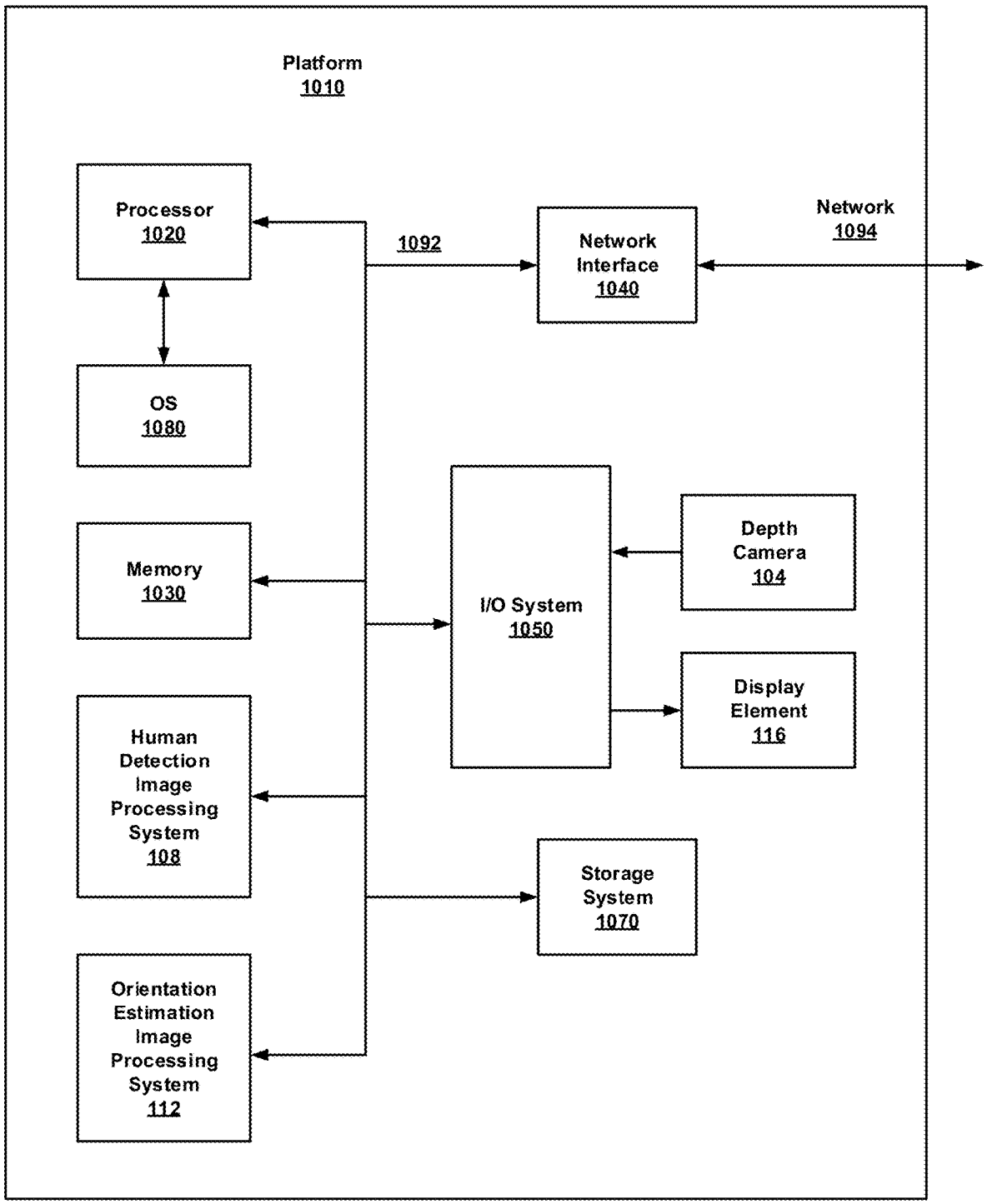
FIG. 10 is a block diagram schematically illustrating a system platform configured to perform human orientation estimation in images, in accordance with certain of the embodiments disclosed herein.

FIG. 10 illustrates an example system 1000 configured to perform estimation of human orientation and facial pose, in images that include depth information, as described herein. In some embodiments, system 1000 comprises a platform 1010 which may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, and so forth. Any combination of different devices may be used in certain embodiments.

In some embodiments, platform 1010 may comprise any combination of a processor 1020, a memory 1030, human detection image processing system 108, orientation estimation image processing system 112, a network interface 1040, an input/output (I/O) system 1050, a depth camera 104, a display element 116 and a storage system 1070. As can be further seen, a bus and/or interconnect 1092 is also provided to allow for communication between the various components listed above and/or other components not shown.

Platform 1010 can be coupled to a network 1094 through network interface 1040 to allow for communications with other computing devices, platforms or resources. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor or a graphics processing unit, to assist in control and processing operations associated with system 1000. In some embodiments, the processor 1020 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor. In some embodiments, processor 1020 may be configured as an x86 instruction set compatible processor.

Memory 1030 can be implemented using any suitable type of digital storage including, for example, flash memory and/or random access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 1000, and therefore may also be implemented using any suitable existing or subsequently-developed platform.

Network interface circuit 1040 can be any appropriate network chip or chipset which allows for wired and/or wireless connection between other components of computer system 1000 and/or network 1094, thereby enabling system 1000 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not, limited to, wireless local area networks, wireless personal area networks, wireless metropolitan area networks, cellular networks, and satellite networks.

I/O system 1050 may be configured to interface between various I/O devices and other components of computer system 1000. I/O devices may include, but not be limited to, a depth camera 104, a display element 116, and other devices not shown such as a keyboard, mouse, microphone, speaker, etc.

I/O system 1050 may include a graphics subsystem configured to perform processing of images for display element 116. Graphics subsystem may be a graphics processing unit or a visual processing unit (VPU), for example. An analog or digital interface may be used to communicatively couple graphics subsystem and display element 116. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1020 or any chipset of platform 1010. In some embodiments, display element 116 may comprise any television type monitor or display. Display element 116 may comprise, for example, a computer display screen, touchscreen display, video monitor, television-like device, and/or a television. Display element 116 may be digital and/or analog. Under the control of the OS 1080 (or one or more software applications), platform 1010 may display images and detection results on display element 116. The images may be provided by depth camera 104 and the orientation estimation results may be provided by orientation estimation image processing system 112, as described herein.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

Orientation estimation image processing system 112 is configured to estimate the orientation and facial pose of a human detected in an image, for example by human detection image processing system 108. The images include depth information to be used by the processing systems and may be provided by depth camera 104. Orientation estimation image processing system 112 may include any or all of the components illustrated in FIGS. 1, 4, 5, 6, and 8 as described above. Orientation estimation image processing system 112 can be implemented or otherwise used in conjunction with a variety of suitable software and/or hardware that is coupled to or that otherwise forms a part of platform 1010. System 112 can additionally or alternatively be implemented or otherwise used in conjunction with user I/O devices that are capable of providing information to, and receiving information and commands from, a user. These I/O devices may include display element 116, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments, human detection image processing system 108 and orientation estimation image processing system 112 may be installed local to system 1000, as shown in the example embodiment of FIG. 10. Alternatively, system 1000 can be implemented in a client-server arrangement wherein at least some functionality associated with these circuits is provided to system 1000 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 1094 or remotely coupled to network 1094 by one or more other networks and/or communication channels. In some cases access to resources on a given network or computing system may require credentials such as usernames, passwords, and/or compliance with any other suitable security mechanism.

In various embodiments, system 1000 may be implemented as a wireless system, a wired system, or a combination of both. When implemented as a wireless system, system 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the orientation estimation methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1094. In other embodiments the functionalities disclosed herein can be incorporated into other software applications, such as video editing applications, video analysis applications, video surveillance applications, or other content generation, modification, and/or management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1000 may comprise additional, fewer, or alternative subcomponents as compared to those included in the example embodiment of FIG. 10.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for orientation estimation of humans in images. The method comprises: detecting, by a processor, a human in an image generated by a depth camera; estimating, by the processor, an orientation category associated with the detected human, the estimation based on application of a random forest classifier with leaf node template matching, to the image, wherein the orientation category defines a range of angular offsets relative to an angle corresponding to the human facing the depth camera; and performing, by the processor, a three dimensional (3D) facial pose estimation of the detected human, based on detected facial landmarks, in response to a determination that the estimated orientation category includes the angle corresponding to the human facing the depth camera.

Example 2 includes the subject matter of Example 1, further comprising estimating the orientation category based on a vote of leaf node template matches from decision trees of the random forest classifier.

Example 3 includes the subject matter of Examples 1 or 2, further comprising training the random forest classifier, the training comprising: providing training sample images to the random forest classifier; segmenting the training sample images into a plurality of patches; evaluating discrimination performance at each non-leaf node of decision trees of the random forest classifier, the discrimination between combinations of the plurality of patches; and selecting, at each non-leaf node of each decision tree of the random forest classifier, a path to a child node based on the discrimination performance.

Example 4 includes the subject matter of any of Examples 1-3, wherein the 3D facial pose estimation comprises: mapping the detected facial landmarks to three dimensions based on the values of depth pixels in the image; estimating a rotation matrix and a translation matrix associated with a transformation between the 3D mapped facial features and a 3D template of a standard facial pose; and calculating Euler angles for the 3D facial pose estimation based on a Lower/Upper (LU) decomposition of the rotation matrix.

Example 5 includes the subject matter of any of Examples 1-4, wherein the estimation of the rotation matrix and the translation matrix is based on a least squares minimization calculation.

Example 6 includes the subject matter of any of Examples 1-5, further comprising validating the detected facial landmarks to reject landmarks determined to be in error.

Example 7 includes the subject matter of any of Examples 1-6, wherein the detecting of a human further comprises: segmenting the image into a plurality of windows; estimating distance to a subject in each of the plurality of windows, based on depth pixels of the image in the window; filtering the plurality of windows to reject windows outside of a desired window size range thereby defining a target set of windows, the desired window size range based on the estimated subject distance and on a focal length of the depth camera; generating classifier features for each of the windows in the target set; creating candidate windows through execution of a cascade classifier, the cascade classifier to perform preliminary detection of a human in each of the windows in the target set, based on the generated features; merging neighboring candidate windows; and executing a linear classifier on the merged candidate windows to verify the detection of a human.

Example 8 includes the subject matter of any of Examples 1-7, wherein the orientation category is one of frontal, frontal-left, frontal-right, left, right, and back.

Example 9 is a system for orientation estimation of humans in images. The system comprises: a human detection image processing system to detect a human in an image generated by a depth camera; an orientation classification circuit to estimate an orientation category associated with the detected human, the estimation based on application of a random forest classifier with leaf node template matching, to the image, wherein the orientation category defines a range of angular offsets relative to an angle corresponding to the human facing the depth camera; and a facial pose estimation circuit to estimate a three dimensional (3D) facial pose of the detected human, based on detected facial landmarks, in response to a determination that the estimated orientation category includes the angle corresponding to the human facing the depth camera.

Example 10 includes the subject matter of Example 9, wherein the orientation classification circuit further comprises a voting circuit to estimate the orientation category based on a vote of leaf node template matches from decision trees of the random forest classifier.

Example 11 includes the subject matter of Examples 9 or 10, wherein the orientation classification circuit further comprises a classifier training circuit to train the random forest classifier circuit, the training comprising: providing training sample images to the random forest classifier circuit; segmenting the training sample images into a plurality of patches; evaluating discrimination performance at each non-leaf node of decision trees of the random forest classifier, the discrimination between combinations of the plurality of patches; and selecting, at each non-leaf node of each decision tree of the random forest classifier, a path to a child node based on the discrimination performance.

Example 12 includes the subject matter of any of Examples 9-11, wherein the facial pose estimation circuit further comprises: a landmark detection circuit to map the detected facial landmarks to three dimensions based on the values of depth pixels in the image; a rotation and estimation circuit to estimate a rotation matrix and a translation matrix associated with a transformation between the 3D mapped facial features and a 3D template of a standard facial pose; and an LU decomposition circuit to calculate Euler angles for the 3D facial pose estimation based on a Lower/Upper (LU) decomposition of the rotation matrix.

Example 13 includes the subject matter of any of Examples 9-12, wherein the estimation of the rotation matrix and the translation matrix is based on a least squares minimization calculation.

Example 14 includes the subject matter of any of Examples 9-13, wherein the landmark detection circuit is further to validate the detected facial landmarks to reject landmarks determined to be in error.

Example 15 includes the subject matter of any of Examples 9-14, wherein the human detection image processing system further comprises: a window generation circuit to segment the image into a plurality of windows; a window filtering circuit to: estimate distance to a subject in each of the plurality of windows, based on depth pixels of the image in the window; and filter the plurality of windows to reject windows outside of a desired window size range thereby defining a target set of windows, the desired window size range based on the estimated subject distance and on a focal length of the depth camera; a candidate detection circuit to: generate classifier features for each of the windows in the target set; and create candidate windows through execution of a cascade classifier, the cascade classifier to perform preliminary detection of a human in each of the windows in the target set, based on the generated features; a candidate merging circuit to merge neighboring candidate windows; and a candidate verification circuit to execute a linear classifier on the merged candidate windows to verify the detection of a human.

Example 16 includes the subject matter of any of Examples 9-15, wherein the orientation category is one of frontal, frontal-left, frontal-right, left, right, and back.

Example 17 is at least one non-transitory computer readable storage medium having instructions encoded thereon that, when executed by one or more processors, result in the following operations for orientation estimation of humans in images. The operations comprise: detecting a human in an image generated by a depth camera; estimating an orientation category associated with the detected human, the estimation based on application of a random forest classifier with leaf node template matching, to the image, wherein the orientation category defines a range of angular offsets relative to an angle corresponding to the human facing the depth camera; and performing a three dimensional (3D) facial pose estimation of the detected human, based on detected facial landmarks, in response to a determination that the estimated orientation category includes the angle corresponding to the human facing the depth camera.

Example 18 includes the subject matter of Example 17, the operations further comprising estimating the orientation category based on a vote of leaf node template matches from decision trees of the random forest classifier.

Example 19 includes the subject matter of Examples 17 or 18, the operations further comprising, training the random forest classifier, the training comprising: providing training sample images to the random forest classifier; segmenting the training sample images into a plurality of patches; evaluating discrimination performance at each non-leaf node of decision trees of the random forest classifier, the discrimination between combinations of the plurality of patches; and selecting, at each non-leaf node of each decision tree of the random forest classifier, a path to a child node based on the discrimination performance.

Example 20 includes the subject matter of any of Examples 17-19, wherein the 3D facial pose estimation comprises the operations of: mapping the detected facial landmarks to three dimensions based on the values of depth pixels in the image; estimating a rotation matrix and a translation matrix associated with a transformation between the 3D mapped facial features and a 3D template of a standard facial pose; and calculating Euler angles for the 3D facial pose estimation based on a Lower/Upper (LU) decomposition of the rotation matrix.

Example 21 includes the subject matter of any of Examples 17-20, wherein the estimation of the rotation matrix and the translation matrix is based on a least squares minimization calculation.

Example 22 includes the subject matter of any of Examples 17-21, the operations further comprising validating the detected facial landmarks to reject landmarks determined to be in error.

Example 23 includes the subject matter of any of Examples 17-22, wherein the detecting of a human further comprises the operations of: segmenting the image into a plurality of windows; estimating distance to a subject in each of the plurality of windows, based on depth pixels of the image in the window; filtering the plurality of windows to reject windows outside of a desired window size range thereby defining a target set of windows, the desired window size range based on the estimated subject distance and on a focal length of the depth camera; generating classifier features for each of the windows in the target set; creating candidate windows through execution of a cascade classifier, the cascade classifier to perform preliminary detection of a human in each of the windows in the target set, based on the generated features; merging neighboring candidate windows; and executing a linear classifier on the merged candidate windows to verify the detection of a human.

Example 24 includes the subject matter of any of Examples 17-23, wherein the orientation category is one of frontal, frontal-left, frontal-right, left, right, and back.

Example 25 is a system for orientation estimation of humans in images. The system comprises: means for detecting a human in an image generated by a depth camera; means for estimating an orientation category associated with the detected human, the estimation based on application of a random forest classifier with leaf node template matching, to the image, wherein the orientation category defines a range of angular offsets relative to an angle corresponding to the human facing the depth camera; and means for performing a three dimensional (3D) facial pose estimation of the detected human, based on detected facial landmarks, in response to a determination that the estimated orientation category includes the angle corresponding to the human facing the depth camera.

Example 26 includes the subject matter of Example 25, further comprising means for estimating the orientation category based on a vote of leaf node template matches from decision trees of the random forest classifier.

Example 27 includes the subject matter of Examples 25 or 26, further comprising training the random forest classifier, the training comprising: means for providing training sample images to the random forest classifier; means for segmenting the training sample images into a plurality of patches; means for evaluating discrimination performance at each non-leaf node of decision trees of the random forest classifier, the discrimination between combinations of the plurality of patches; and means for selecting, at each non-leaf node of each decision tree of the random forest classifier, a path to a child node based on the discrimination performance.

Example 28 includes the subject matter of any of Examples 25-27, wherein the 3D facial pose estimation comprises: means for mapping the detected facial landmarks to three dimensions based on the values of depth pixels in the image; means for estimating a rotation matrix and a translation matrix associated with a transformation between the 3D mapped facial features and a 3D template of a standard facial pose; and means for calculating Euler angles for the 3D facial pose estimation based on a Lower/Upper (LU) decomposition of the rotation matrix.

Example 29 includes the subject matter of any of Examples 25-28, wherein the estimation of the rotation matrix and the translation matrix is based on a least squares minimization calculation.

Example 30 includes the subject matter of any of Examples 25-29, further comprising means for validating the detected facial landmarks to reject landmarks determined to be in error.

Example 31 includes the subject matter of any of Examples 25-30, wherein the detecting of a human further comprises: means for segmenting the image into a plurality of windows; means for estimating distance to a subject in each of the plurality of windows, based on depth pixels of the image in the window; means for filtering the plurality of windows to reject windows outside of a desired window size range thereby defining a target set of windows, the desired window size range based on the estimated subject distance and on a focal length of the depth camera; means for generating classifier features for each of the windows in the target set; means for creating candidate windows through execution of a cascade classifier, the cascade classifier to perform preliminary detection of a human in each of the windows in the target set, based on the generated features; means for merging neighboring candidate windows; and means for executing a linear classifier on the merged candidate windows to verify the detection of a human.

Example 32 includes the subject matter of any of Examples 25-31, wherein the orientation category is one of frontal, frontal-left, frontal-right, left, right, and back.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method for orientation estimation of humans in images, the method comprising:
   detecting, by a processor-based system, a human in an image generated by a depth camera;
   estimating, by the processor-based system, an orientation category associated with the detected human, the orientation category defining a range of angular offsets relative to an angle corresponding to the human facing the depth camera; the estimating based on application of a random forest classifier with leaf node template matching;

performing, by the processor-based system, a three dimensional (3D) facial pose estimation of the detected human, based on detected facial landmarks, in response to a determination that the estimated orientation category includes the angle corresponding to the human facing the depth camera; and training the random forest classifier, the training including:
- segmenting training sample images into a plurality of patches;
- evaluating discrimination performance at each of one or more non-leaf nodes of one or more decision trees of the random forest classifier, the discrimination between combinations of the plurality of patches; and
- selecting, at each of one or more non-leaf nodes of each of one or more decision trees of the random forest classifier, a path to a child node based on the discrimination performance.

2. The method of claim 1, wherein the orientation category is one of frontal, frontal-left, frontal-right, left, right, and back.

3. The method of claim 1, wherein the orientation category is associated with a head and shoulder region of the detected human.

4. A method for orientation estimation of humans in images, the method comprising:
- detecting, by a processor-based system, a human in an image generated by a depth camera;
- estimating, by the processor-based system, an orientation category associated with the detected human, the orientation category defining a range of angular offsets relative to an angle corresponding to the human facing the depth camera; and
- performing, by the processor-based system, a three dimensional (3D) facial pose estimation of the detected human, based on detected facial landmarks, in response to a determination that the estimated orientation category includes the angle corresponding to the human facing the depth camera, the 3D facial pose estimation including:
  - mapping the detected facial landmarks to three dimensions based on values of depth pixels in the image;
  - estimating a rotation matrix and a translation matrix associated with a transformation between the 3D mapped facial features and a 3D template of a standard facial pose, the estimating of the rotation matrix and the translation matrix based on a least squares minimization calculation; and
  - calculating Euler angles for the 3D facial pose estimation based on a Lower/Upper (LU) decomposition of the rotation matrix.

5. The method of claim 4, further including validating the detected facial landmarks to reject landmarks determined to be in error.

6. The method of claim 4, wherein the estimating of the orientation category is based on application, to the image, of a random forest classifier with leaf node template matching, and the estimating includes estimating the orientation category based on a vote of leaf node template matches from decision trees of the random forest classifier.

7. A method for orientation estimation of humans in images, the method comprising:
- detecting, by a processor-based system, a human in an image generated by a depth camera, the detecting of a human including:
  - segmenting the image into a plurality of windows;
  - estimating distance to a subject in each of the plurality of windows, based on depth pixels of the image in the window;
  - filtering the plurality of windows to reject windows outside of a desired window size range to define a target set of windows, the desired window size range based on the estimated subject distance and on a focal length of the depth camera;
  - generating classifier features for each of the windows in the target set;
  - creating candidate windows through execution of a cascade classifier, the cascade classifier to perform preliminary detection of a human in each of the windows in the target set, based on the generated features;
  - merging neighboring candidate windows; and
  - executing a linear classifier on the merged candidate windows to verify the detection of a human;
- estimating, by the processor-based system, an orientation category associated with the detected human, the orientation category defining a range of angular offsets relative to an angle corresponding to the human facing the depth camera; and
- performing, by the processor-based system, a three dimensional (3D) facial pose estimation of the detected human, based on detected facial landmarks, in response to a determination that the estimated orientation category includes the angle corresponding to the human facing the depth camera.

8. A system for orientation estimation of humans in images, the system comprising:
- a human detection image processing system to detect a human in an image generated by a depth camera;
- an orientation classification circuit to estimate an orientation category associated with the detected human, the orientation category to define a range of angular offsets relative to an angle corresponding to the human facing the depth camera, the estimation based on application of a random forest classifier with leaf node template matching; and
- a facial pose estimation circuit to estimate a three dimensional (3D) facial pose of the detected human, based on detected facial landmarks, in response to a determination that the estimated orientation category includes the angle corresponding to the human facing the depth camera,
- wherein the orientation classification circuit includes a classifier training circuit to train the orientation classification circuit by:
  - segmenting training sample images into a plurality of patches;
  - evaluating discrimination performance at each non-leaf node of decision trees of the random forest classifier, the discrimination between combinations of the plurality of patches; and
  - selecting, at each non-leaf node of each decision tree of the random forest classifier, a path to a child node based on the discrimination performance.

9. The system of claim 8, wherein the orientation category is associated with a head and shoulder region of the detected human.

10. A system for orientation estimation of humans in images, the system comprising:
- a human detection image processing system to detect a human in an image generated by a depth camera;
- an orientation classification circuit to estimate an orientation category associated with the detected human, the orientation category to define a range of angular offsets relative to an angle corresponding to the human facing the depth camera; and
- a facial pose estimation circuit to estimate a three dimensional (3D) facial pose of the detected human, based on detected facial landmarks, in response to a determination that the estimated orientation category includes the angle corresponding to the human facing the depth camera, the facial pose estimation circuit including:
    - a landmark detection circuit to (i) map the detected facial landmarks to three dimensions based on values of depth pixels in the image, and (ii) validate the detected facial landmarks to reject landmarks determined to be in error;
    - a rotation and estimation circuit to estimate a rotation matrix and a translation matrix associated with a transformation between the 3D mapped facial features and a 3D template of a standard facial pose, the estimation of the rotation matrix and the translation matrix based on a least squares minimization calculation; and
    - an LU decomposition circuit to calculate Euler angles for the 3D facial pose estimation based on a Lower/Upper (LU) decomposition of the rotation matrix.

11. The system of claim 10, wherein the orientation classification circuit includes a voting circuit to estimate the orientation category based on a vote of leaf node template matches from decision trees of a random forest classifier.

12. A system for orientation estimation of humans in images, the system comprising:
- a human detection image processing system to detect a human in an image generated by a depth camera;
- an orientation classification circuit to estimate an orientation category associated with the detected human, the orientation category to define a range of angular offsets relative to an angle corresponding to the human facing the depth camera; and
- a facial pose estimation circuit to estimate a three dimensional (3D) facial pose of the detected human, based on detected facial landmarks, in response to a determination that the estimated orientation category includes the angle corresponding to the human facing the depth camera, wherein the human detection image processing system includes:
    - a window generation circuit to segment the image into a plurality of windows;
    - a window filtering circuit to:
        - estimate distance to a subject in each of the plurality of windows, based on depth pixels of the image in the window; and
        - filter the plurality of windows to reject windows outside of a desired window size range to define a target set of windows, the desired window size range based on the estimated subject distance and on a focal length of the depth camera;
    - a candidate detection circuit to:
        - generate classifier features for each of the windows in the target set; and
        - create candidate windows through execution of a cascade classifier, the cascade classifier to perform preliminary detection of a human in each of the windows in the target set, based on the generated features;
    - a candidate merging circuit to merge neighboring candidate windows; and
    - a candidate verification circuit to execute a linear classifier on the merged candidate windows to verify the detection of a human.

13. At least one computer readable storage device comprising computer readable instructions that, when executed, cause one or more processors to at least:
- detect a human in an image generated by a depth camera;
- estimate an orientation category associated with the detected human, the orientation category to define a range of angular offsets relative to an angle corresponding to the human facing the depth camera, the estimation based on application of a random forest classifier with leaf node template matching;
- perform a three dimensional (3D) facial pose estimation of the detected human, based on detected facial landmarks, in response to a determination that the estimated orientation category includes the angle corresponding to the human facing the depth camera; and
- train the random forest classifier, wherein to train the random forest classifier, the instructions cause the one or more processors to:
    - segment training sample images into a plurality of patches;
    - evaluate discrimination performance at each of one or more non-leaf nodes of one or more decision trees of the random forest classifier, the discrimination between combinations of the plurality of patches; and
    - select, at each of one or more non-leaf nodes of each of one or more decision trees of the random forest classifier, a path to a child node based on the discrimination performance.

14. The at least one computer readable storage device of claim 13, wherein the orientation category is one of frontal, frontal-left, frontal-right, left, right, and back.

15. The at least one computer readable storage device of claim 13, wherein the orientation category is associated with a head and shoulder region of the detected human.

16. At least one computer readable storage device comprising computer readable instructions that, when executed, cause one or more processors to at least:
- detect a human in an image generated by a depth camera;
- estimate an orientation category associated with the detected human, the orientation category to define a range of angular offsets relative to an angle corresponding to the human facing the depth camera; and
- perform a three dimensional (3D) facial pose estimation of the detected human, based on detected facial landmarks, in response to a determination that the estimated orientation category includes the angle corresponding to the human facing the depth camera, wherein to perform the 3D facial pose estimation, the instructions cause the one or more processors to:
    - map the detected facial landmarks to three dimensions based on values of depth pixels in the image;
    - estimate a rotation matrix and a translation matrix associated with a transformation between the 3D mapped facial features and a 3D template of a standard facial pose; and
    - calculate Euler angles for the 3D facial pose estimation based on a Lower/Upper (LU) decomposition of the rotation matrix.

17. The at least one computer readable storage device of claim 16, wherein the estimation of the orientation category is based on application to the image of a random forest classifier with leaf node template matching, and the instructions cause the one or more processors to estimate the orientation category based on a vote of leaf node template matches from decision trees of the random forest classifier.

18. The at least one computer readable storage device of claim 16, wherein the estimation of the rotation matrix and the translation matrix is based on a least squares minimization calculation.

19. The at least one computer readable storage device of claim 16, wherein the instructions cause the one or more processors to validate the detected facial landmarks to reject landmarks determined to be in error.

20. At least one computer readable storage device comprising computer readable instructions that, when executed, cause one or more processors to at least:
 detect a human in an image generated by a depth camera by:
  segmenting the image into a plurality of windows;
  estimating distance to a subject in each of the plurality of windows, based on depth pixels of the image in the window;
  filtering the plurality of windows to reject windows outside of a desired window size range to define a target set of windows, the desired window size range based on the estimated subject distance and on a focal length of the depth camera;
  generating classifier features for each of the windows in the target set;
  creating candidate windows through execution of a cascade classifier, the cascade classifier to perform preliminary detection of a human in each of the windows in the target set, based on the generated features;
  merging neighboring candidate windows; and
  executing a linear classifier on the merged candidate windows to verify the detection of a human;
 estimate an orientation category associated with the detected human, the orientation category to define a range of angular offsets relative to an angle corresponding to the human facing the depth camera; and
 perform a three dimensional (3D) facial pose estimation of the detected human, based on detected facial landmarks, in response to a determination that the estimated orientation category includes the angle corresponding to the human facing the depth camera.

* * * * *